United States Patent [19]
Nagata et al.

[11] Patent Number: 5,851,023
[45] Date of Patent: Dec. 22, 1998

[54] AIR BAG DEVICE FOR PASSENGER SEAT

[75] Inventors: Norinari Nagata, Ama-gun; Yuji Kuriyama, Seki, both of Japan

[73] Assignee: Toyoda Tosei Co., Ltd., Aichi-ken, Japan

[21] Appl. No.: 756,379

[22] Filed: Nov. 26, 1996

[30]    Foreign Application Priority Data

Nov. 27, 1995  [JP]  Japan .................................... 7-307584

[51] Int. Cl.⁶ ............................ B60R 21/20; B60R 21/16
[52] U.S. Cl. .................................. 280/728.3; 280/728.2; 280/732
[58] Field of Search ............................. 280/728.3, 728.2, 280/732

[56]              References Cited

U.S. PATENT DOCUMENTS

| | | | |
|---|---|---|---|
| 5,303,951 | 4/1994 | Goestenkors et al. | 280/732 |
| 5,354,093 | 10/1994 | Schenck et al. | 280/728.2 |
| 5,474,323 | 12/1995 | Davidson | 280/728.2 |
| 5,538,277 | 7/1996 | Frary et al. | 280/728.2 |
| 5,549,324 | 8/1996 | Labrie et al. | 280/728.3 |
| 5,588,669 | 12/1996 | Leonard et al. | 280/728.3 |
| 5,613,700 | 3/1997 | Hiramitsu et al. | 280/728.2 |

FOREIGN PATENT DOCUMENTS

7-117606   9/1995   Japan .

*Primary Examiner*—Charles Jordan
*Assistant Examiner*—Theresa M. Wesson
*Attorney, Agent, or Firm*—Cushman Darby & Cushman, IP Group of Pillsbury Madison & Sutro LLP

[57]            ABSTRACT

A passenger-side air bag device is provided including a door comprising a cover body and a side wall portion extending downwardly therefrom. Lock legs are disposed on the cover body and are configured to lock the door to the inner circumferential edge of an opening portion of an instrument panel. A housing constructed and arranged to be fixed to a car body includes slot portions into which the side wall portion of the door is fitted, and pawl portions for locking the circumferential edges of the lock holes of the door side wall portion to thereby prevent the door side wall portion from coming off from the slot portion. Gaps are provided in three directions between the door and the housing to compensate for any misalignment between the door and the housing.

7 Claims, 5 Drawing Sheets

AIR BAG DEVICE FOR PASSENGER SEAT

BACKGROUND OF THE INVENTION

1. Field of the Invention

The present invention relates to a passenger-side air bag device disposed in an instrument panel in front of a passenger seat of a vehicle.

2. Description of the Related Art

Conventionally, a passenger-side air bag device comprises an air bag, an inflator for supplying an inflating gas to the air bag, a door for covering the air bag, and a housing for holding the air bag, the inflator and the door (see Japanese Patent Publication No. Hei. 7-117606, and the like).

The door is disposed over an opening portion of the instrument panel so as to cover the folded air bag in the housing. The door is connected to and supported by the housing by means of bolts and nuts or rivets. Further, the housing is fixedly connected to a connection part (for example, reinforcement) directly extended from a vehicle frame. The door is connected firmly to the housing by means of bolts, or the like, because the door is intended to be opened smoothly without any deformation of the door when the air bag is expanded.

In this conventional air bag device, however, the door supported by the housing is often misaligned to the opening portion of the instrument panel because the housing is not directly connected to the instrument panel.

Therefore, a great deal of labor is required to produce a good fit between the door and the instrument panel, including management of tolerances of the instrument panel and air bag parts. This conventional configuration causes both an increase in the number of production steps and an increase in production cost. Furthermore, a great deal of labor is also required to assemble the air bag device.

SUMMARY OF THE INVENTION

The present invention solves the aforementioned problem. The object of the present invention is to provide a passenger-side air bag device having a good fit between an opening portion of an instrument panel and a door disposed in this opening portion, while minimizing the number of production and assembly steps.

According to the present invention, there is provided an air bag device comprising a housing constructed and arranged to be connected to a vehicle body frame of a vehicle such that the housing is disposed adjacent to an opening of an instrument panel; an inflator disposed in the housing; an air bag disposed on the inflator such that the air bag expands when the inflator discharges gas into the air bag; and a door member connected to the housing wherein the door member is adapted to cover the opening of the instrument panel, and wherein gaps are provided in three directions between the housing and the door member so as to compensate for any misalignment between the housing and the door member.

In the air bag device in the present invention, the door member may also include a cover body for openably covering the opening of the instrument panel wherein the cover body has an outer circumferential edge, and a side wall portion extending downwardly from the outer circumferential edge of the cover body. The housing may also include a slot portion into which the side wall portion of the door member is disposed.

Further, lock legs may be disposed at the outer circumferential edge of the cover body so as to lock the door member on an inner circumferential edge of the opening portion of the instrument panel.

Furthermore, the side wall portion has lock holes, and pawl portions are formed on an inner circumferential surfaces of the slot portion so as to be arranged to be locked in the lock holes of the door side wall portion to thereby prevent the side wall portion from being disconnected from the slot portion.

In the air bag device for a passenger seat according to the present invention, gaps are provided in three directions between the door member and the housing to compensate for any misalignment between the door member and the housing. Accordingly, even in the case where the housing is fixedly connected to the vehicle body frame through the connection part and where the door is locked on the circumferential edge of the opening portion of the instrument panel by using the lock legs, misalignment between the housing and the door is absorbed by gaps in the slot portion, side walls and door side wall portion. Further, because the door is locked on the circumferential edge of the opening portion of the instrument panel by using the lock legs on the outer circumferential edge of the cover body, fitting between the cover body of the door and the opening portion of the instrument panel is preserved. Further, because the error can be absorbed by gaps in the assembling sizes of the slot portions, side walls and door side wall portion even in the case where the management of the size of parts and the management of assembling work are not performed strictly, strict production and assembling of parts are not required so that both the number of steps in production and assembling of parts and the cost therefor can be reduced.

Particularly, even in the case where there is some room between the housing and the door side wall portion so that three-dimensional gaps are generated in the assembling size thereof, positioning is easy so that the housing and the door can be easily connected to each other because of the structure in which places opened in the transverse direction of the door side wall portion are inserted into the slot portions.

Further, because the housing and the door can be connected to each other only by locking the pawl portions on the circumferential edges of the lock holes without use of bolts, rivets, or the like, both the number of steps at the time of the connection and the cost therefor can be reduced more greatly.

Accordingly, in the air bag device for a passenger seat according to the present invention, well fitting between the opening portion of the instrument panel, and the door to be disposed in this opening portion can be obtained while the number of steps in production and assembling of parts as well as the cost therefor are reduced even in the case where the door is connected to the housing.

Further, places opposite to each other in the transverse direction of the door side wall portion receive pressure intensively so as to be expanded outward at the time of the expansion of the air bag compared with places opposite to each other in the longitudinal direction of the door side wall portion but lock holes in the places opposite to each other in the transverse direction and pawl portions locked in the lock holes or the circumferential edges thereof are covered with places of the housing constituting the slot portions so as to be housed in the slot portions. Accordingly, intensive pressure at the time of the expansion of the air bag is received by the whole surface of the places of the housing, so that the pressure can be diffused and the pawl portions can be prevented from being disconnected from the circumferential edges of the lock holes.

DETAILED DESCRIPTION OF THE PREFERRED EMBODIMENT

An embodiment of the present invention will be described below with reference to the drawings.

Figure 1:
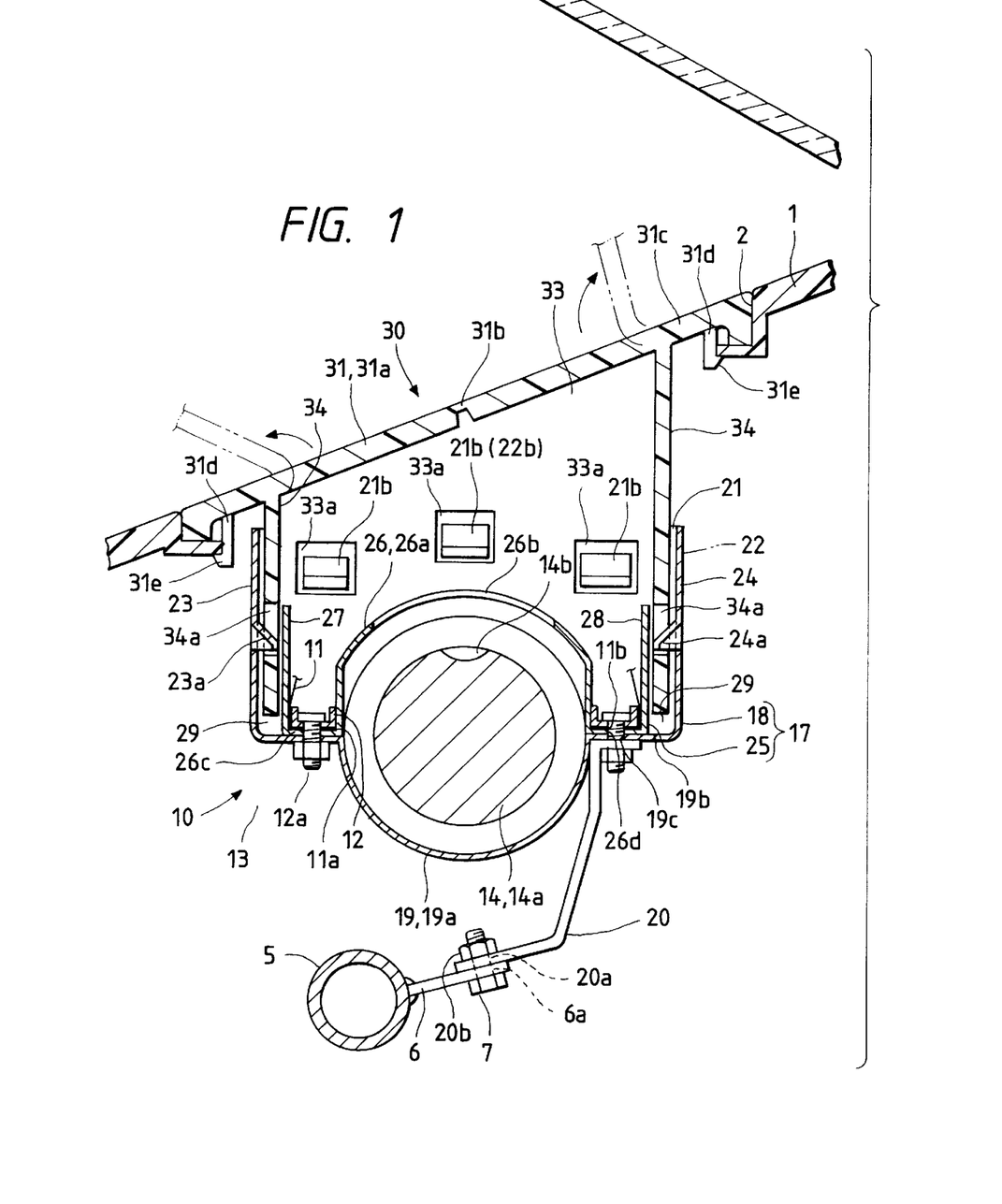
FIG. 1 is a vertical sectional view showing an air bag device according to an embodiment of the present invention mounted on a vehicle body.
Figure 2:
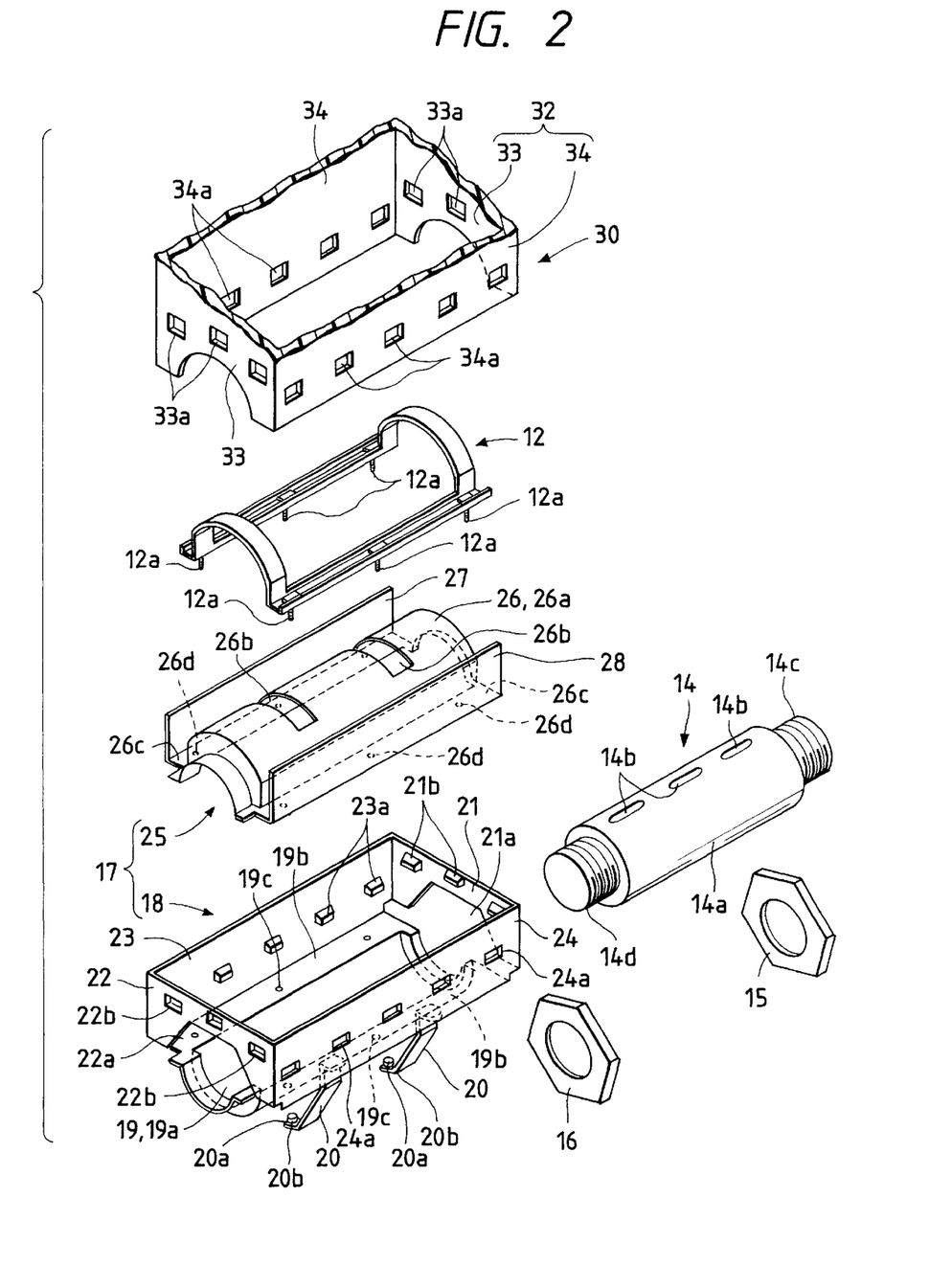
FIG. 2 is an exploded perspective view of a door, a housing, an inflator of the embodiment of FIG. 1.
Figure 3:
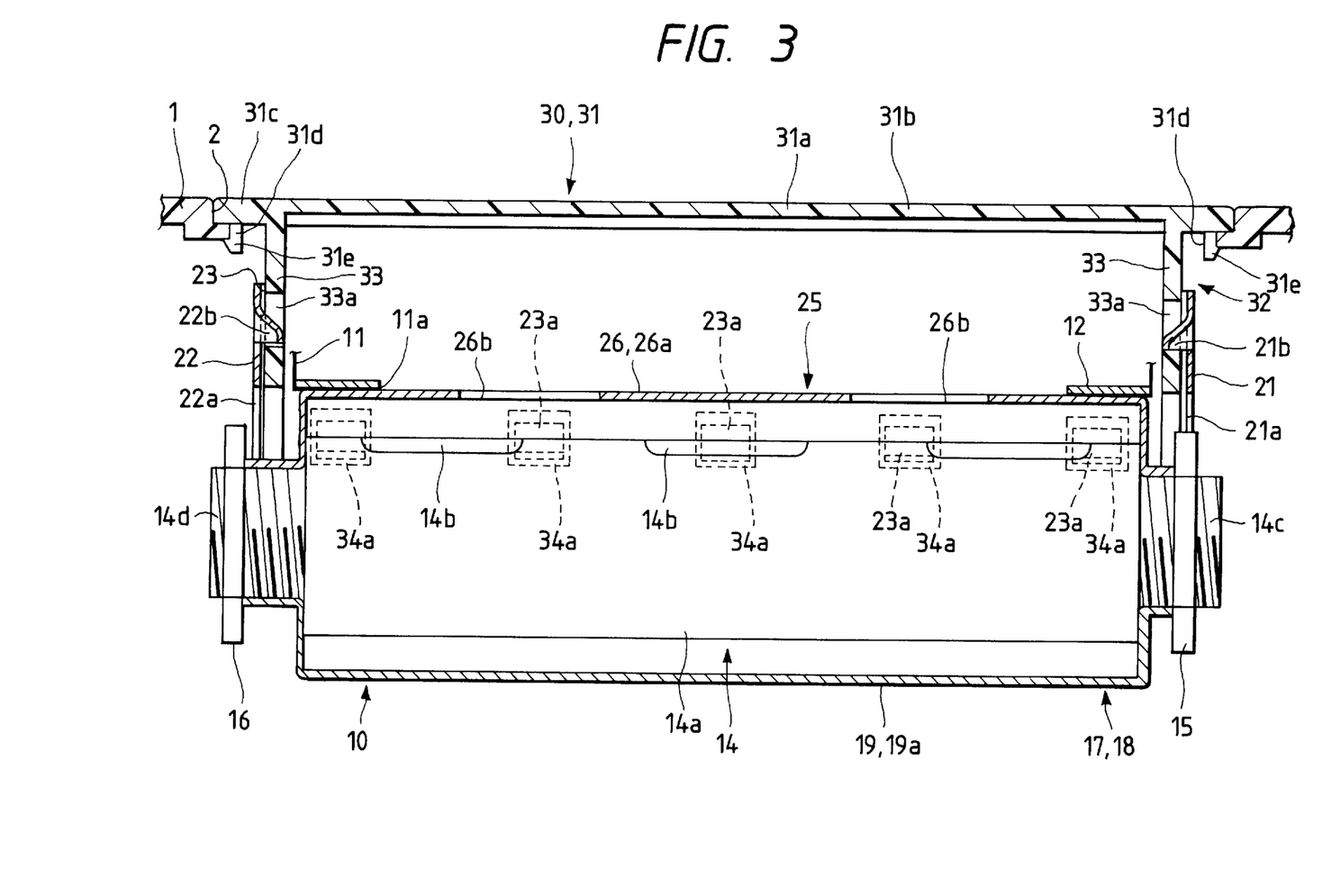
FIG. 3 is a vertical sectional view showing the air bag device of FIG. 1 mounted on the vehicle body but in a direction perpendicular to that in FIG. 1.

In this embodiment, as shown in FIGS. 1 to 3, a passenger-side air bag device 10 comprises an air bag assembly including an air bag 11 and an inflator 14, a housing 17, and a door 30.

The air bag 11 includes in its lower portion, an opening portion 11a having a substantially rectangular-shape. A plurality of mount holes 11b (six mount holes in this embodiment) for mounting the air bag 11 to the housing 17 are formed in the periphery of the opening portion 11a. The air bag 11 is designed to be mounted to the housing 17 by using a substantially four-sided annular retainer 12 made of sheet metal having bolts 12a projected from its lower surface to pass through the mount holes 11b, respectively.

The inflator 14 of the present embodiment is a cylinder type, though those skilled in the art will readily recognize that other cylinder types could be used. In the inflator 14, gas ejection ports 14b through which ejecting gas passes are disposed in predetermined positions along the body 14a of the inflator 14. Male screw portions 14c and 14d for mounting the inflator 14 to the housing 17 are formed at opposite ends of the body 14a.

The housing 17 comprises an outer housing or body 18 and an inner housing or diffuser 25, each of which is formed of sheet metal.

The body 18 includes a bottom wall 19 and four side walls 21, 22, 23 and 24 disposed upwardly from the periphery of the bottom wall 19 so as to be shaped substantially like a rectangular trough. The bottom wall 19 has a semi-cylindrically curved surface portion 19a, and flat surface portions 19b extended horizontally from opposite edges of the curved surface portion 19a. Mount holes 19c through which the bolts 12a of the retainer 12 pass are formed in the two flat surface portions 19b.

Further, two brackets 20 for connecting and fixing the housing 17 to a connection part 5 are fixed to one of the flat surface portions 19b. The connection part 5 is configured to be connected to a vehicle body frame (not shown). A nut 20b is fixed to each of the brackets 20 providing a screw hole 20a. A bracket 6 having a mount hole 6a is disposed from the connection part 5 and is configured to connect the connection part 5 to the bracket 20. If a bolt 7 inserted into the mount hole 6a of the bracket 6 is thread-engaged with the screw hole 20a, the housing 17 can be fixedly connected, through the connection part 5, to the vehicle body frame.

Insertion holes 21a and 22a for mounting the inflator 14 are formed in the side walls 21 and 22 of the body 18. The holes 21a and 22a are disposed so as to be opposite to each other in the longitudinal direction of the body 18. A plurality of pawl portions 21b, 22b, 23a and 24a are formed on the side walls 21 and 22 and on the side walls 23 and 24 of the body 18. The panel portion 21b, 22b, 23a and 24a are arranged so as to be opposite to each other in the transverse direction of the body 18 (in this embodiment, three pawl portions 21b, three pawl portions 22b, five pawl portions 23a and five pawl portions 24a are provided). The pawl portions are configured to lock into lock holes 33a, 34a of a sidewall portion 32 of the door 30, as described below. To ensure the strength of the pawl portions, the pawl portions 21b, 22b, 23a and 24a are formed by drawing the side walls 21, 22, 23 and 24 so that each of the pawl portions is shaped like a downward opened hood.

The diffuser 25 has a substantially semi-cylindrical bottom wall 26 for covering the upper side of the inflator body 14a, and side walls 27 and 28 disposed upwardly from opposite edges of the bottom wall 26. The bottom wall 26 has a substantially semi-cylindrical curved surface portion 26a, flat surface portions 26c extended horizontally from opposite edges of the curved surface portion 26a. Predetermined openings 26b are formed in the curved surface portion 26a in order to diffuse gas from the inflator 14 and allow the gas to enter smoothly into the air bag 11. Mount holes 26d through which the bolts 12a of the retainer 12 are passed are formed in each of the flat surface portions 26c.

The side walls 27 and 28 are arranged in the inside of the side walls 23 and 24 of the body 18 so as to be opposite to each other. The side walls 27 and 28, the side walls 23 and 24 and the flat surface portions 19b of the body 18 form slot portions 29 (as shown in FIG. 1) into which side walls 34 are disposed when the air bag device is assembled. The side walls 23 and 24 form outer wall portions of the slot portions 29 and the flat surface portions 19b form bottom wall portions of the slot portions 29.

The door 30 is formed of synthetic resin such as styrene type thermoplastic elastomer, olefin type thermoplastic elastomer, or the like. The door 30 has a cover body 31 for covering an opening portion 2 of an instrument panel 1 and a rectangular pipe-shaped side wall portion 32 extended downwardly from the periphery of the cover body 31.

In the cover body 31, an open portion 31a is provided on the portion of the cover body 31 inside of the side wall portion 32. The open portion 31a opens when the air bag 11 is deployed. A breakable portion 31b is formed in the back surface of the open portion 31a. The breakable portion 31b is provided by forming an H-shaped groove (as viewed from above) in the back surface of the open portion 31a. A plurality of lock legs 31d (eight lock legs in this embodiment) projecting downwardly are formed in outer circumferential edges 31c of the cover body 31 outside of the side wall portion 32. The lock legs 31d can be locked at inner circumferential edges of instrument panel opening portions 2 when hook portions 31e of the lock legs 31d engage the inner circumferential edges of the instrument panel opening portions 2.

To prevent the door 30 from being displaced upwardly away from the circumferential edges of the instrument panel opening portions 2 when the lock legs 31d are locked, the lock legs 31d are formed so that the distance between the upper surface of the hook portion 31e and the lower surface of an outer circumferential edge 31c in the cover body corresponds to the thickness of a circumferential edge portion in each of the opening portions 2. To prevent lateral shifting of the door 30, the respective outer side surfaces of the lock legs 31*d* are configured to substantially engage the inner circumferential surfaces of the opening portions 2.

The rectangular pipe-shaped door side wall portion 32 has side walls 33 opposite to each other in the longitudinal direction of the side wall portion 32 and side walls 34 opposite to each other in the transverse direction of the portion 32. When the door 30 is to be connected to the housing 17, the side walls 33 are disposed in the inside of the side walls 21 and 22 of the housing body 18 and the side walls 34 are fitted into the slot portions 29 of the housing 17. Lock holes 33*a*, 34*a* are formed in the side walls 33, 33, 34 and 34 so that the circumferential edges thereof are locked by the respective pawl portions 21*b*, 22*b*, 23*a* and 24*a*.

Figure 4:
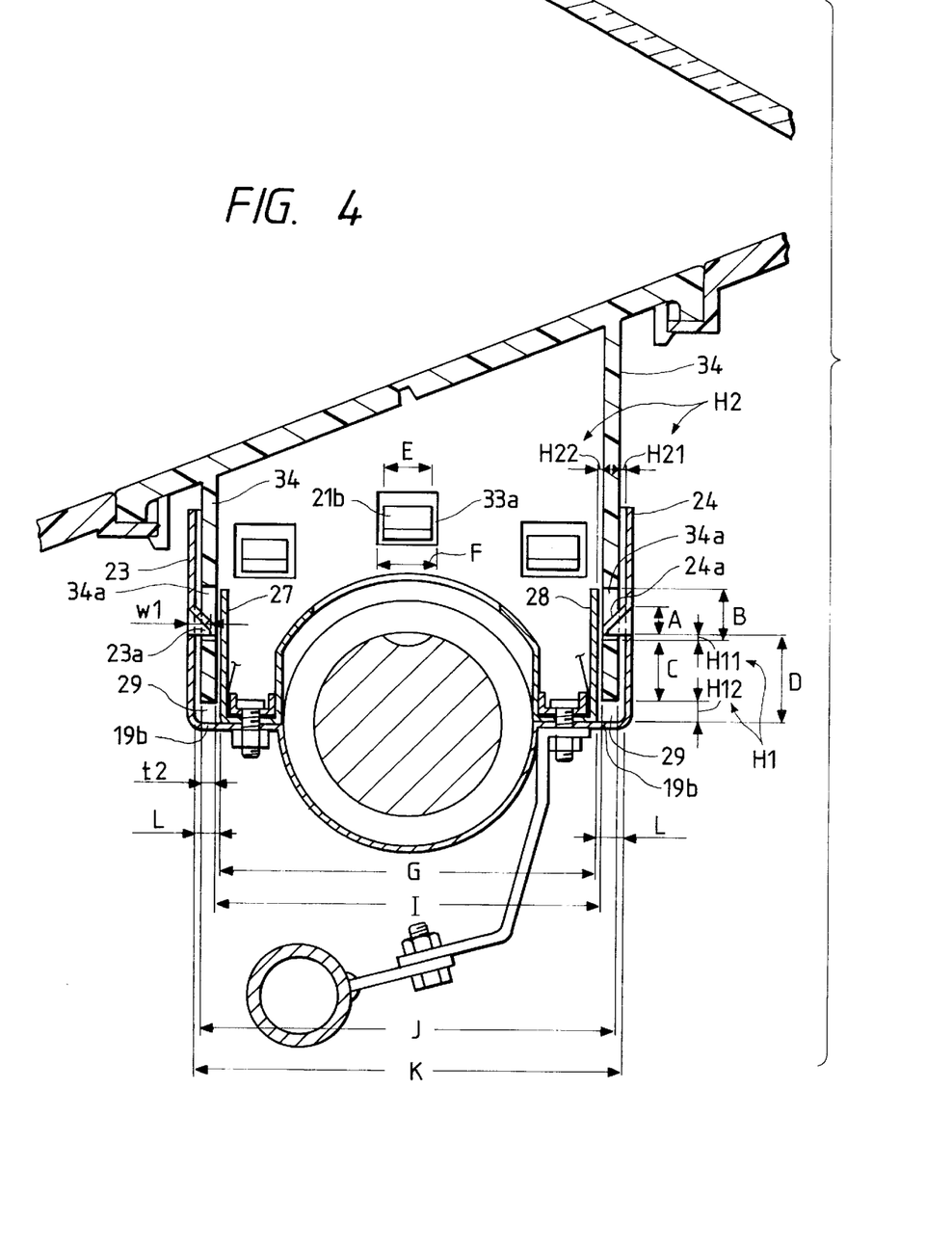
FIG. 4 is a view of FIG. 1 with alphabetical symbols indicating dimensions.
Figure 5:
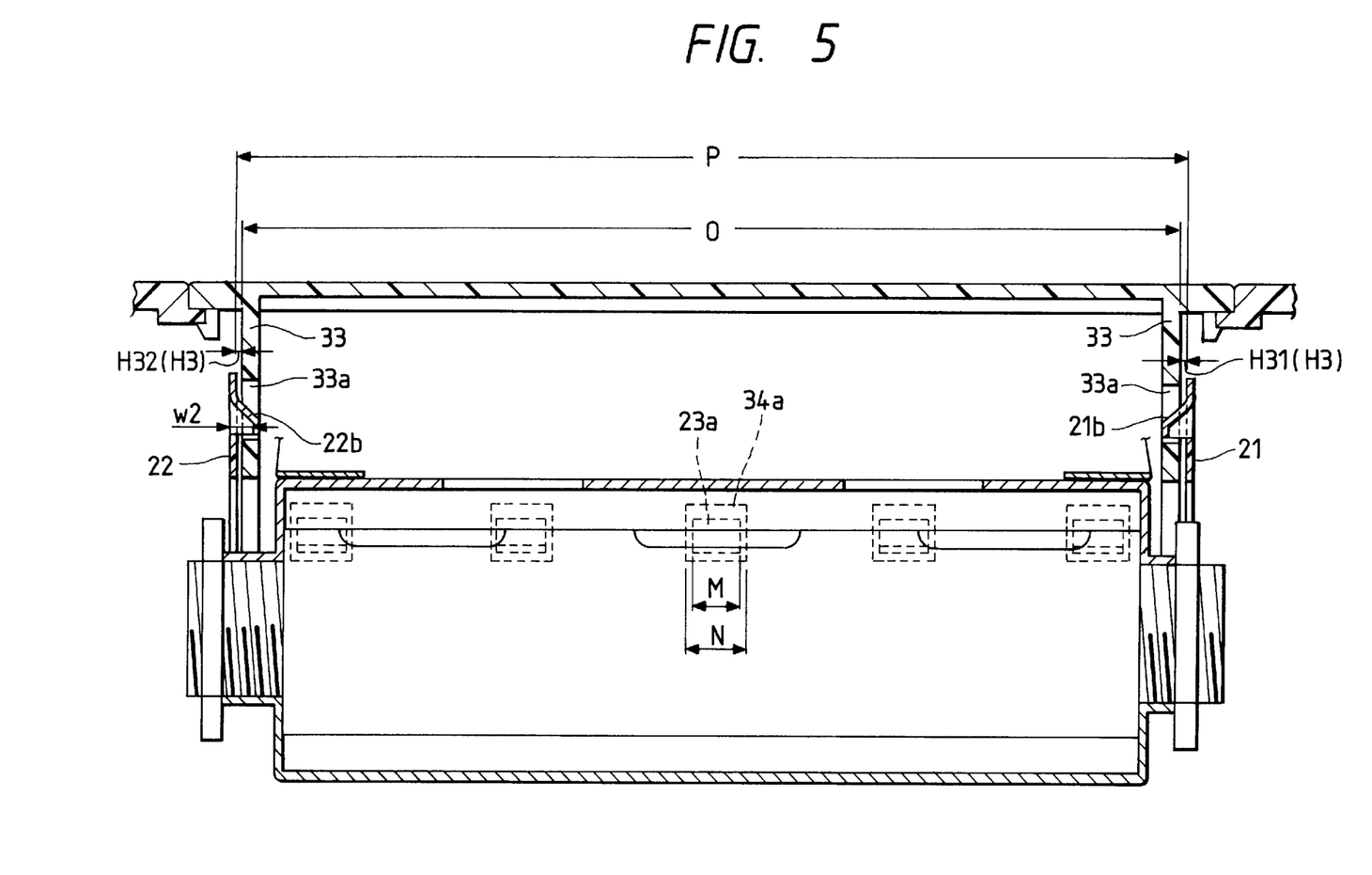
FIG. 5 is a view of FIG. 3 with alphabetical symbols indicating dimensions.

In this embodiment, as shown in FIGS. 4 and 5, the housing 17 and the door 30 are designed so that the spacing of the slot portions 29, side walls 21 and 22 and door side wall portion 32 are set to provide gaps or slack in three directions. Specifically, a gap H1 (H1=H11+H12) is provided in the vertical direction, a gap H2 (H2=H21+H22) is provided in the front-rear direction, and a gap H3 (H3=H31+H32) is provided in the left-right direction when the pawl portions 21*b*, 22*b*, 23*a* and 24*a* on the circumferential edges of the lock holes 33*a* and 34*a* is in a locked state, i.e., secured as shown in FIGS. 4 and 5.

More particularly, to provide the gap H1 in the vertical direction, the vertical size B of the lock holes 33*a* and 34*a* of the door side wall portion 32 is set larger than the vertical size A of the pawl portions 21*b*, 22*b*, 23*a* and 24*a*, and the size D of the portion of housing 17 from the pawl portions 23*a* and 24*a* to the bottom wall portions 19*b* is set to be larger than the size C of the portion of door side wall portion 32 from the lock holes 34*a* to the lower end of the side walls 34.

Further, to determine the size of the gap H1 strictly, the gap H1 is not defined only by the setting of the sizes A and B of the pawl portions 21*b*, 22*b*, 23*a* and 24*a* and lock holes 33*a* and 34*a*, respectively, but is also defined by the spacing of the slot portions 29 and side walls 34 such that (B−A)≧(D−C) wherein D−C=H1. In this embodiment, the size C, the size D and the gap H1 (H1=H11+H12) are selected to be 15 mm, 21 mm and 6 mm, respectively. The gap H1 is preferably selected to be greater than or equal to 2 mm because assembling error, or the like, is not adequately compensated for if the gap H1 is smaller than 2 mm.

To provide the gap H2 in the front-rear direction, the width size F of the lock holes 33*a* of the side walls 33 is set larger than the width size E of the pawl portions 21*b* and 22*b* of the side walls 21 and 22 of the housing 17, the size I between the inner surfaces of the front-rear direction side walls 34 is set larger than the size G between the outer surfaces of the two inner wall portions 27 and 28 of the diffuser 25, and the size K between the inner surfaces of the two outer wall portions 23 and 24 of the body 18 is set larger than the size J between the outer surfaces of the front-rear direction side walls 34.

Further, to define the size of the gap H2 strictly, the gap H2 is not defined only by the setting of the sizes E and F of the pawl portions 21*b* and 22*b* and the lock holes 33*a*, respectively, but is also defined by the spacing of the slot portions 29 and the side walls 34 such that (F−E)≧[{(K−G)−(J−I)}/2] wherein {(K−G)−(J−I)}/2=H2. Of course, the size L (L=(K−G)/2), the opening width of the slot portions 29, must be smaller than the sum of the thickness t2 (t2=(J−I)/2) of the side walls 34 and the width w1 of the pawl portions 23*a* and 24*a* so that the pawl portions 23*a* and 24*a* cannot be dislodged from the lock holes 34*a*.

In this embodiment, the size K, the size G, the opening width of the slot portions 29 L, the size J, the size I, the thickness t2 and the width w1 are selected to be 103 mm, 92 mm, 5.5 mm, 101 mm, 94 mm, 3.5 mm and 4.5 mm, respectively, so that the gap H2 (H2=H21+H22=L−t2) is defined to be 2 mm. The gap H2 is preferably selected to be between 2 to 4 mm because assembling error, or the like, is not adequately compensated for if the gap H2 is smaller than 2 mm and because the pawl portions 23*a* and 24*a* cannot be locked sufficiently in the lock holes 34*a* if the gap H2 is larger than 4 mm.

To provide the gap H3 in the left-right direction, the size N of the width of the lock holes 34*a* of the side walls 34 is set larger than the size M of the width of the pawl portions 23*a* and 24*a* of the outer wall portions 23 and 24 of the housing 17, and the size P between the inner surfaces of the side walls 21 and 22 of the body 18 is set larger than the size O between the outer surfaces of the left-right direction side walls 33 and 33.

Further, to define the gap H3 strictly, the gap H3 is not defined only by the setting of the sizes M and N of the pawl portions 23*a* and 24*a* and the lock holes 34*a*, respectively, but is also defined by the spacing of the side walls 21 and 22 and the side walls 33 and 33 such that (N−M)≧(P−O) wherein (P−O)=H3. Of course, the gap H3 must be smaller than the width w2 of the pawl portions 21*b* and 22*b* so that the pawl portions 21*b* and 22*b* cannot be dislodged from the lock holes 33*a*.

In this embodiment, the size P, the size O and the width w2 are selected to be 203 mm, 201 mm and 4.5 mm, respectively, so that the gap H3 (H3=H31+H32=P−O) is selected to be 2 mm. The gap H3 is preferably selected to be between 2 to 4 mm because assembling error, or the like, is not adequately compensated for if the gap H3 is smaller than 2 mm and because the pawl portions 21*b* and 22*b* cannot be locked sufficiently in the lock holes 33*a* if the gap H3 is larger than 4 mm.

Further, this embodiment is configured so that not only the positions of the pawl portions 21*b*, 22*b*, 23*a* and 24*a* correspond to the positions of the lock holes 33*a* and 34*a* but also the gaps in the vertical direction, in the front-rear direction and in the left-right direction between the pawl portions 21*b*, 22*b*, 23*a* and 24*a* and the inner surfaces of the lock holes 33*a* and 34*a* at the time of the lock of the pawl portions 21*b*, 22*b*, 23*a* and 24*a* are coincident with the gaps H11, H12, H21, H22, H31 and H32 even when the housing 17 and the door 30 are assembled with some displacement. In other words, the positions of the pawl portions 21*b*, 22*b*, 23*a* and 24*a* correspond to the positions of the lock holes 33*a* and 34*a* so that the correspondence is set to be (B−A)=(D−C), (F−E)=[{(K−G)−(J−I)}/2] and (N−M)=(P−O). When such a configuration is achieved, the spacing of respective parts when assembled are coincident with each other in the vertical direction, in the front-rear direction and in the left-right direction. Accordingly, expansion forces, for example, acting on the air bag 11 can be diffused so as to be evenly imposed on respective parts.

Next, the attachment of the air bag device 10 of this embodiment to a vehicle body will be described. First, the air bag device 10 is assembled. For assembling the air bag device 10, the retainer 12 is put into the air bag 11 while the bolts 12*a* are inserted into the mount holes 11*b*, respectively, and the air bag 11 is folded.

Then, the inflator 14 is arranged from above with respect to the housing body 18 so that its opposite ends are projected from the insertion holes 21*a* and 22*a*. The diffuser 25 is arranged. The bolts 12a of the retainer 12 are made to pass through the mount holes 26d and 19c of the diffuser 25 and housing body 18. The nuts 13 are thread-engaged with the bolts 12a, respectively.

Then, the nuts 15 and 16 are thread-engaged with the male screw portions 14c and 14d so that the inflator 14 is fixed to the housing 17.

Finally, the side walls 34 are then fitted into the slot portions 29 of the housing 17, and the side walls 33 are disposed inside of the side walls 21 and 22 of the housing body 18 so that the pawl portions 21b, 22b, 23a and 24a are locked on the circumferential edges of the lock holes 33a and 34a of the side wall 33 and 34, thereby completing assembly of the air bag device 10.

Thus, even in the case where there is some room between the housing 17 and the door side portion 32 so that three-dimensional gaps H1, H2 and H3 are generated in the spacing thereof, positioning is easy. The housing 17 and the door 30 can be connected to each other easily because of the structure in which the side walls 34 opposite to each other in the transverse direction of the door side wall portion 32 are inserted into the slot portions 29. Accordingly, the air bag device 10 can be assembled easily.

Further, because the housing 17 and the door 30 can be connected to each other easily by locking the pawl portions 21b, 22b, 23a and 24a on the circumferential edges of the lock holes 33a and 34a without bolts, rivets, or the like, assembly is made easier.

The air bag device 10 can be placed through the opening portion 2 of the instrument panel 1 mounted to the vehicle body in advance, and the lock legs 31d of the door 30 are locked on the circumferential edges of the opening portion 2.

When bolts 7 are thread-engaged through the mount holes 6a of the brackets 6, the air bag device 10 can be mounted into the place on the instrument panel 1.

Although the mounting of the air bag device 10 onto the vehicle body has been described about the case where the instrument panel 1 is mounted to the vehicle body in advance, there may be another mounting method in which: for example, the air bag device 10 is attached to the instrument panel 1 by locking the lock legs 31d on the circumferential edges of the opening portion 2 before the mounting of the instrument panel 1 onto the vehicle body; the air bag 10 is connected to the connection part 5 by means of the brackets 20; and then the instrument panel 1 is fixedly connected to the vehicle body.

Further, even in the case where the air bag device 10 of this embodiment is configured so that door side wall portion 32 is connected to the housing 17 through the pawl portions 21b, 22b, 23a and 24a, the assembling size of the slot portions 29, side walls 21 and 22 and door side wall portion 32 is set so that gaps H1, H2 and H3 are generated in three directions (vertical direction, front-rear direction and left-right direction) while the locked state of the pawl portions 21b, 22b, 23a and 24a on the circumferential edges of the lock holes 33a and 34a is secured.

Accordingly, even in the case where the housing 17 is connected and fixed to the vehicle body frame through the connection part 5 and where the door 30 is locked on the circumferential edge of the opening portion 2 of the instrument panel by using the lock legs 31d, error in connection between the housing 17 and the door 30 is absorbed by gaps H1, H2 and H3 in the spacing of the slot portions 29, side walls 21 and 22 and door side wall portion 32. Further, because the door 30 is locked on the circumferential edge of the opening portion 2 of the instrument panel by using the lock legs 31d of the outer circumferential edges 31c of the cover body, spacing between the cover body 31 of the door 30 and the opening portion 2 of the instrument panel is uniform. Further, because assembly error can be absorbed by gaps H1, H2 and H3 in the spacing of the slot portions 29, side walls 21 and 22 and door side wall portion 32, even in the case where the management of the size of parts and the management of assembling work are not performed strictly, strict production and assembling of parts is not required so that both the number of steps in production and assembling of parts and the cost therefor can be reduced remarkably.

When the air bag 11 is deployed, a breakable portion 31b in the open portion 31a of the door 30 is broken so that the air bag 11 is greatly expanded from the open portion 31a. Though the door 30 is urged upwardly by the air bag 11 when the breakable portion 31b is broken, the pawl portions 21b, 22b, 23a and 24a lock the lower edge of the lock holes 33a and 34a thereby limiting the upward movement of the door side wall portion 32. As a result, the breakable portion 31b is broken smoothly.

Further, in the air bag device 10 of this embodiment, the side walls 34 are outwardly urged by the expansion of the air bag 11 as compared with the side walls 33, but the lock holes 34a in the side walls 34 resist this force and the pawl portions 23a and 24a. Accordingly, intensive pressure at the time of the expansion of the air bag 11 is received by the whole surface of the inner wall portions 27 and 28, so that the pressure can be diffused and that the pawl portions 23a and 24a can be prevented from being disconnected from the circumferential edges of the lock holes 34a.

Although the present embodiment has been described wherein the pawl portions 21b and 22b are provided on the side walls 21 and 22 and the lock holes 33a are provided in the corresponding side walls 33 of the door side wall portion 32, the pawl portions 21b and 22b and the lock holes 33a need not be provided because pressure acting on the side walls 33 at the time of the expansion of the air bag 11 is smaller than pressure acting on the side of the side walls 34.

Although the present embodiment has shown the side wall portion 32 of the door 30 shaped substantially rectangularly, the side wall portion 32 may also be formed so as to be separated into distinct side walls.

Although the present embodiment has shown the pawl portions 23a and 24a formed from the outer wall portions 23 and 24, the pawl portions locked on the lock holes 34a may be formed in the inner wall portions 27 and 28.

Although the present embodiment has shown the side walls 21 and 22 of the housing 17 arranged on the outer surfaces of the side walls 33, the side walls of the housing 17 may be arranged on the inner surfaces of the side walls 33 by removing the side walls 21 and 22 from the body 18 and by forming the side walls from the diffuser 25, or the like. Also in this case, the operation and effect of the present invention can be obtained if the size between the inner surfaces of the side walls 33 and the size between the outer surfaces of the side walls of the housing 17 provided in the inner surfaces of the side walls 33 are set so that the gap H3 can be secured.

What is claimed is:

1. An air bag device disposed in an opening of an instrument panel of a vehicle, said air bag device comprising:

an air bag;

door member having a cover body for opening and covering the opening of the instrument panel and a side wall portion extending downwardly from an outer circumferential edge of said cover body, said door member opening upon inflation of said air bag, and said side wall portion having lock holes;

an outer housing disposed adjacent to the opening of the instrument panel;

an inner housing disposed inside of said outer housing so as to form a slot portion between said outer housing and said inner housing, said side wall portion of said door member being inserted and disposed into said slot portion;

a retainer connected with said inner and outer housing;

pawl portions being formed on one of said inner housing and said outer housing so as to be lockable into said lock holes of said side wall portion; and lock legs disposed on the outer circumferential edge of said cover body and extended downwardly for locking onto an inner circumferential edge of the opening of the instrument panel.

2. The air bag device of claim 1, further comprising an inflator disposed below said inner housing, said inner housing having a covering portion for covering an upper portion of said inflator; and an opening formed in said covering portion so as to diffuse gas from said inflator.

3. The air bag device of claim 2, wherein said covering portion of said inner housing has a semi-cylindrical curved surface portion.

4. The air bag device of claim 1, wherein said lock legs are deformable inwardly.

5. The air bag device of claim 1, wherein said cover body faces a windshield.

6. The air bag device of claim 1, wherein said side wall portion is substantially rectangular shaped.

7. The air bag device of claim 6, wherein said side wall portion has semi-cylindrical cut out portions on lower opposite transverse sides of said side wall portion.

* * * * *